(12) United States Patent
Nakata et al.

(10) Patent No.: US 6,632,295 B2
(45) Date of Patent: Oct. 14, 2003

(54) HIGH TENSILE STRENGTH HOT-ROLLED STEEL SHEET AND METHOD FOR MANUFACTURING THE SAME

(75) Inventors: Hiroshi Nakata, Fukuyama (JP); Tadashi Inoue, Fukuyama (JP); Hiroyasu Kikuchi, Fukuyama (JP); Sadanori Imada, Fukuyama (JP); Akira Hiura, Fukuyama (JP); Takeshi Nakahara, Fukuyama (JP); Satoshi Ishijima, Fukuyama (JP); Yoshimasa Funakawa, Yokohama (JP); Toru Inazumi, Ann Arbor, MI (US)

(73) Assignee: NKK Corporation, Tokyo (JP)

( * ) Notice: Subject to any disclaimer, the term of this patent is extended or adjusted under 35 U.S.C. 154(b) by 49 days.

(21) Appl. No.: 09/864,473

(22) Filed: May 24, 2001

(65) Prior Publication Data

US 2002/0029828 A1 Mar. 14, 2002

Related U.S. Application Data

(63) Continuation of application No. PCT/JP00/06641, filed on Sep. 27, 2000.

(30) Foreign Application Priority Data

Sep. 28, 1999 (JP) .......................... 11-273504
Sep. 14, 2000 (JP) ........................ 2000-279594

(51) Int. Cl.$^7$ .......................... C21D 8/02; C22C 38/14; C22C 38/06
(52) U.S. Cl. .................. 148/320; 148/602; 148/654; 148/661
(58) Field of Search ................. 148/320, 602, 148/654, 661

(56) References Cited

U.S. PATENT DOCUMENTS 5,074,926 A * 12/1991 Tosaka et al. .............. 148/333

FOREIGN PATENT DOCUMENTS

JP  58-91121 A  5/1983

(List continued on next page.)

OTHER PUBLICATIONS

M. Morita et al, "Development of Hot rolled High Strength Steels Hardened by Precipitation hardening with High Stretch Flanging", *Current Advances in Materials and Processes*, vol. 5, p. 1863 (1992) (with English language translation).

Primary Examiner—Deborah Yee
(74) Attorney, Agent, or Firm—Frishauf, Holtz, Goodman & Chick, P.C.

(57) ABSTRACT

A high tensile strength hot-rolled steel sheet comprises 0.04 to 0.09% C, 0.1% or less Si, 0.5 to 1.5% Mn, 0.02% or less P, 0.01% or less S, 0.1% or less Al, 0.001 to 0.008% N, and 0.01 to 0.15% Ti, by mass %, the content of ingredient there each satisfying the equation (1), and the ferritic grain size α (μm) satisfying the equation (2):

[C]+7×[Si]+0.1×[Mn]+[P]+14×[S]+1.75×[Al]

+23×[N]+[Ti]+18×[O]+7×[Cu]+18×[Sn]+7×[Mo]+

1.7×[Cr]+70×[B]+7×[Ca]+14×[Zr]+14×[V]+7×[Nb]

≦2                                                              (1)

3≦α≦60×[Ti]+8                                         (2)

where, [X] denotes the content (mass %) of element X. This hot-rolled steel sheet has excellent workability, high magnetic permeability and high magnetic flux density in a strong magnetic field, and has 490 MPa or higher strength, and is suitable for large electric equipment such as a rotor of generator.

12 Claims, 2 Drawing Sheets

FOREIGN PATENT DOCUMENTS

| | | |
|---|---|---|
| JP | 60-86210 A | 5/1985 |
| JP | 63-166931 A | 7/1988 |
| JP | 8-26433 B2 | 3/1996 |
| JP | 10-183301 A | 7/1998 |
| JP | 11-43724 A | 2/1999 |
| JP | 11-106861 A | 4/1999 |

* cited by examiner

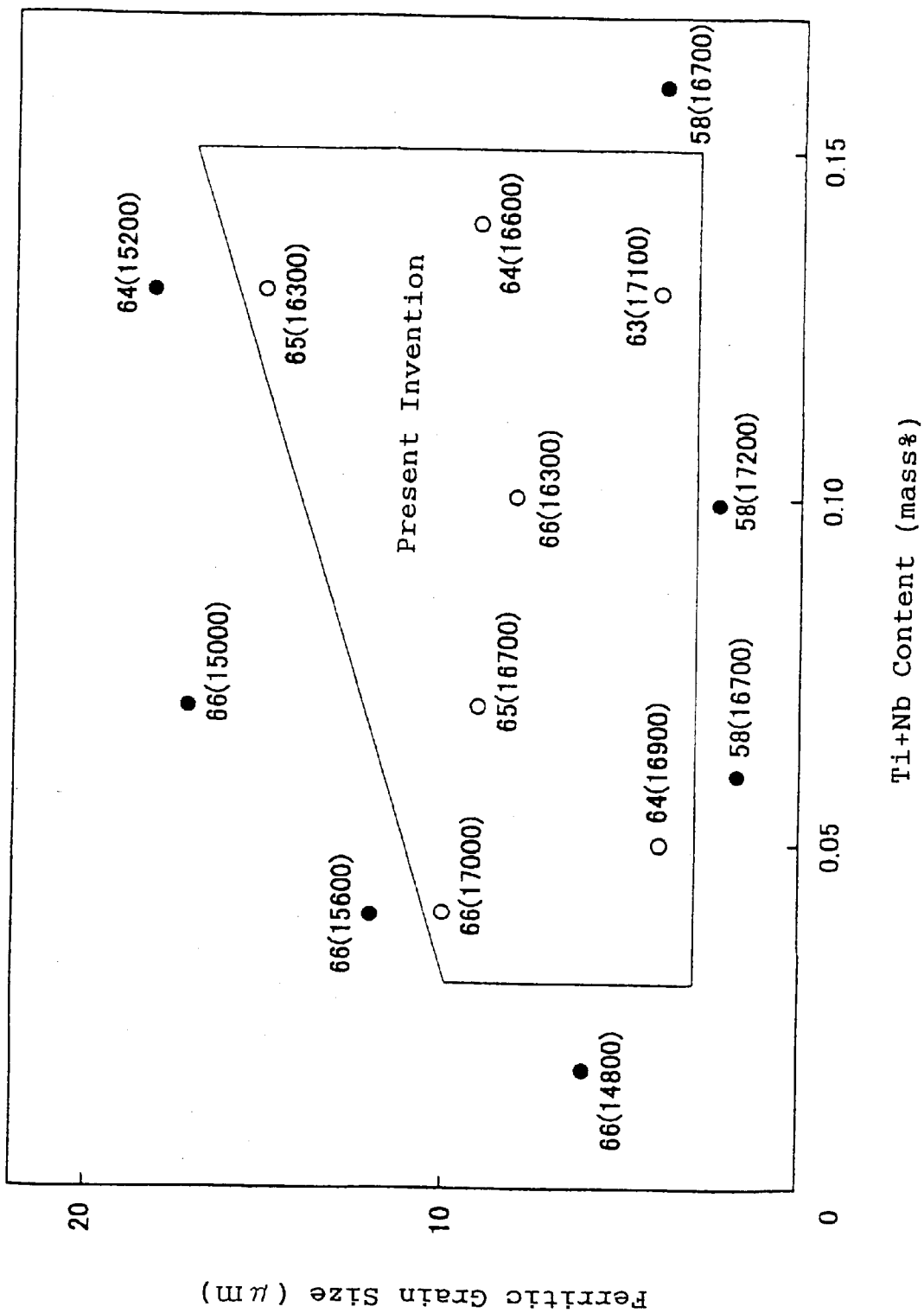

HIGH TENSILE STRENGTH HOT-ROLLED STEEL SHEET AND METHOD FOR MANUFACTURING THE SAME

This application is a continuation application of International Application PCT/JP00/06641 (not published in English) filed Sep. 27, 2000.

BACKGROUND OF THE INVENTION

1. Field of the Invention

The present invention relates to a high tensile strength hot-rolled steel sheet to be used in large electric equipment such as a rotor of generator, particularly to a high tensile strength hot-rolled steel sheet having excellent workability, high magnetic permeability and high magnetic flux density in a strong magnetic field, and strength of at least 490 MPa, and relates to a method for manufacturing thereof.

2. Description of Related Arts

For improving the performance of large electric equipment such as a rotor of generator, the steel sheet to be used therein is requested, in recent years, to have, adding to mechanical characteristics, high magnetic permeability and high magnetic flux density in a strong magnetic field, for example, 2.00 Tesla (T) or higher magnetic flux density B300 in a magnetic field of 30 kA/m. Since the magnetic permeability of a steel sheet increases with a decrease in precipitates and with an increase in crystal grain size, and since the magnetic flux density thereof increases with a decrease in amount of non-magnetic elements, a high tensile strength hot-rolled steel sheet based on a very low carbon steel added with large amount of solid solution strengthening elements Si, Al, and P has been used for the use of the large electric equipment.

The addition of these solid solution strengthening elements, however, cannot easily give high tensile strength of 490 MPa or more, and significantly degrades workability, further reduces magnetic flux density in a strong magnetic field. Accordingly, if the balance between strength, workability, and magnetic characteristics is considered, it is preferable to increase the tensile strength by refining ferritic grains and by forming fine precipitates. Nevertheless, since a steel containing 0.1% or more C produces large amount of cementites and then does not give favorable magnetic characteristics even when the ferritic grains are refined, the C content is necessary to limit to 0.1% or less.

As an example of the high tensile strength hot-rolled steel sheet containing 0.1% or less C and having both fine ferritic grains and fine precipitates, "Current Advances in Materials and Processes" published by The Iron and Steel Institute of Japan, Vol.5, p.1863 (1992), (Literature No.1), proposes a precipitation strengthened hot-rolled steel sheet having excellent stretch flangeability owing to the addition of Ti. The ductility of the hot-rolled steel sheet is improved by reducing the content of C so as to decrease amount of cementites, while the high tensile strength thereof is attained by adding large amount of Ti. JP-B-8-26433, (the term "JP-B" referred to herein signifies "examined Japanese Patent Publication"), discloses a high tensile strength hot-rolled steel sheet consisting mainly of 0.03 to 0.05% C and 0.10 to 0.20% Ti, with improved workability by controlling the volume of both pearlites and low temperature transformation phase. JP-A-63-166931, (the term "JP-A" referred to herein signifies "unexamined Japanese Patent Publication"), discloses a method for manufacturing a high tensile strength hot-rolled steel sheet having high magnetic flux density on the base of a Si—Mn steel containing Ti and B. According to the description of JP-A-63-166931, B is added to improve the hardenability, and a bainitic structure is formed by cooling the hot-rolled steel sheet at a cooling speed of 30° C./sec or more. And the combination of transformation strengthening and TiC precipitation strengthening is utilized to attain both high tensile strength and high magnetic flux density. JP-A-58-91121 discloses a method for manufacturing a high tensile strength hot-rolled steel sheet having high magnetic flux density with the addition of Ti, where the content of Si is limited to 0.10% or less, and the tensile strength is increased by TiC precipitation strengthening.

However, the high tensile strength hot-rolled steel sheet according to Literature No.1 does not have high magnetic permeability because of the large amount of Ti. The high tensile strength hot-rolled steel sheet according to JP-B-8-26433 shows low magnetic permeability due to the existence of pearlites and of low temperature transformation phase. The method of JP-A-63-166931 fails to give high magnetic permeability because of the large content of Si and Mn. Particularly, the significantly large content of 0.21 to 0.30% Si and 1.22 to 1.90% Mn induces problems in surface properties and weldability. By the method of JP-A-58-91121, since the Ti addition is as large as close to Ti/C=1, the magnetic permeability degrades because of the solid solution Ti inevitably left during hot-rolling process, and the surface properties and the weldability degrade due to the large content of Si which is added for obtaining high tensile strength.

SUMMARY OF THE INVENTION

An object of the present invention is to provide a high tensile strength hot-rolled steel sheet having good workability, high magnetic permeability, high magnetic flux density in a strong magnetic field, and having strength of at least 490 MPa, and to provide a method for manufacturing thereof.

The object is attained by a high tensile strength hot-rolled steel sheet, which comprises 0.04 to 0.09% C, 0.1% or less Si, 0.5 to 1.5% Mn, 0.02% or less P, 0.01% or less S, 0.1% or less Al, 0.001 to 0.008% N, and 0.01 to 0.15% Ti, by mass %, the content of ingredient thereeach satisfies the following equation (1), and the ferritic grain size $\alpha$ ($\mu$m) satisfies the following equation (2):

$$[C]+7\times[Si]+0.1\times[Mn]+[P]+14\times[S]+1.75\times[Al]$$
$$+23\times[N]+[Ti]+18\times[O]+7\times[Cu]+18\times[Sn]+7\times[Mo]+$$
$$1.7\times[Cr]+70\times[B]+7\times[Ca]+14\times[Zr]+14\times[V]+7\times[Nb]$$
$$\leq 2 \qquad (1)$$

$$3 \leq \alpha \leq 60\times[Ti]+8 \qquad (2)$$

where, [X] denotes the content (mass %) of element X.

For the prevention of softening of heat-affected zone (HAZ) after welding, a preferred high tensile strength hot-rolled steel sheet is the one which comprises 0.04 to 0.09% C, 0.1% or less Si, 0.5 to 1.5% Mn, 0.02% or less P, 0.01% or less S, 0.1% or less Al, 0.001 to 0.008% N, 0.2% or less Mo, and 0.4% Cr, and at least one selected from 0.01 to 0.15% Ti and 0.005 to 0.05% Nb, by mass %, the content of ingredient thereeach satisfies the above equation (1), and the ferritic grain size $\alpha$ ($\mu$m) satisfies the following equations (3) and (4):

$$3 \leq \alpha \leq 60\times([Ti]+[Nb])+8 \qquad (3)$$

$$[Mn]+6\times[Cr]+15\times[Mo]-0.05\times\alpha \leq 2 \qquad (4)$$

Furthermore, instead of specifying the ferritic grain size as described above, the same effect is obtained with a high tensile strength hot-rolled steel sheet comprising 0.04 to 0.09% C, 0.1% or less Si, 0.5 to 1.5% Mn, 0.02% or less P, 0.01% or less S, 0.1% or less Al, 0.001 to 0.008% N, and 0.01 to 0.15% Ti, by mass %, or with a high tensile strength hot-rolled steel sheet comprising 0.04 to 0.09% C, 0.1% or less Si, 0.5 to 1.5% Mn, 0.02% or less P, 0.01% or less S, 0.1% or less Al, 0.001 to 0.008% N, 0.2% or less Mo, and 0.4% Cr, and at least one selected from 0.01 to 0.15% Ti and 0.005 to 0.05% Nb, by mass %, wherein the pearlite area percentage is 5% or less.

That type of high tensile strength hot-rolled steel sheet can be manufactured by a method comprising the steps of: preparing a slab of steel comprising the chemical compositions described above; hot-rolling the slab at a finishing temperature of from $Ar_3$ transformation point to 880° C.; cooling the hot-rolled steel sheet to a temperature range of from 630 to 680° C. at an average cooling speed of from 15 to 35° C./sec. Alternatively, that type of high tensile strength hot-rolled steel sheet can be manufactured by a method comprising the steps of: preparing a slab of steel comprising the chemical compositions described above; hot-rolling the slab at a finishing temperature of from $Ar_3$ transformation point to 880° C.; cooling the hot-rolled steel sheet to 680° C. at an average cooling speed of 15° C./sec or more; and coiling the cooled steel sheet at a coiling temperature of from 500 to 650° C.

BRIEF DESCRIPTION OF THE DRAWINGS

FIG. 2 is a graph showing the influence of (Ti+Nb) content and ferritic grain size on the magnetic permeability and the balance between TS and El.

DETAILED DESCRIPTION OF THE INVENTION

Figure 1:
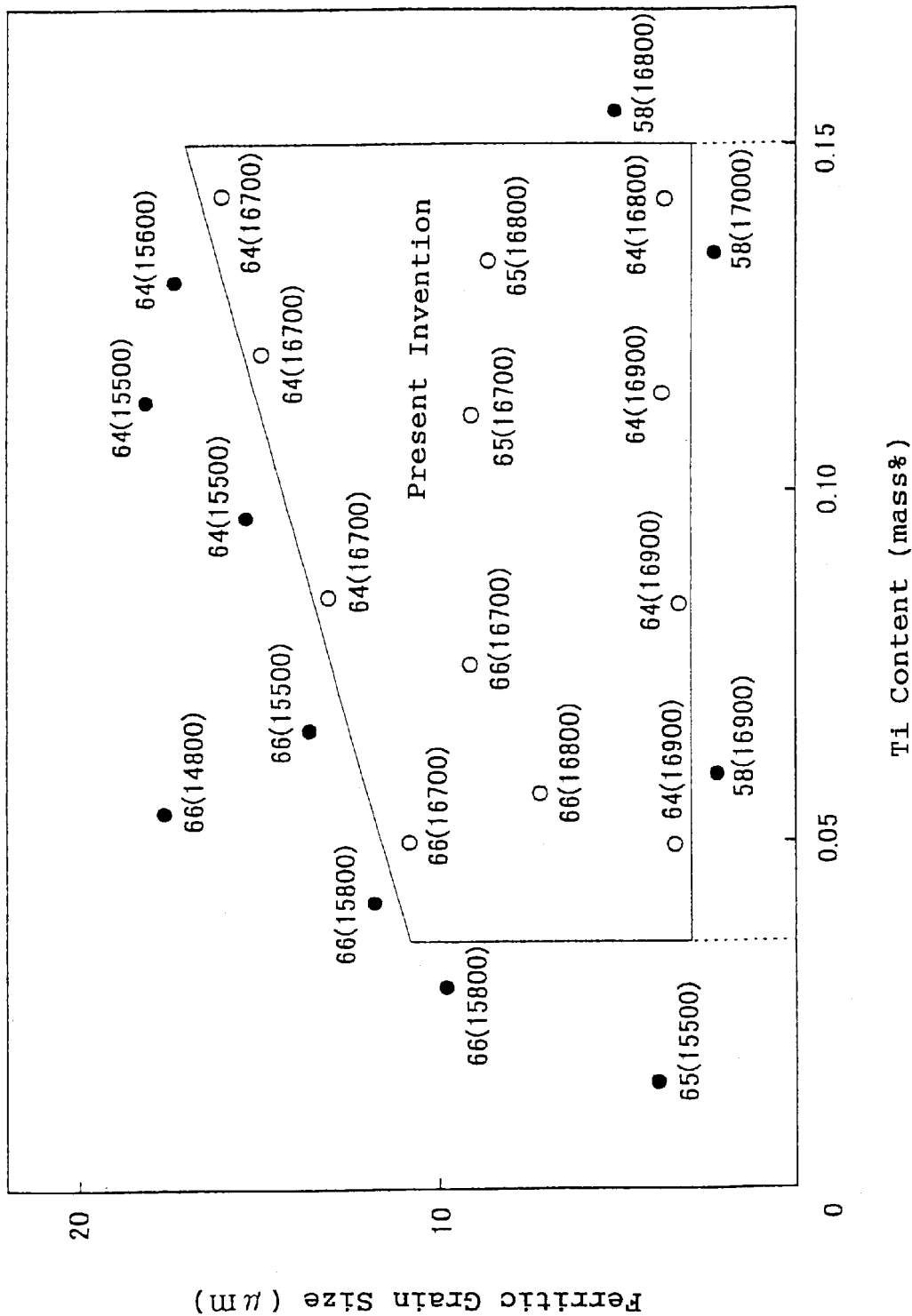
FIG. 1 is a graph showing the influence of Ti content and ferritic grain size on the magnetic permeability and the balance between TS and El.

We carried out extensive study on the high tensile strength hot-rolled steel sheet having excellent workability, high magnetic permeability, high magnetic flux density B300 giving 2.00 T or more, and strength of 490 MPa or more, and found that the use of a steel of 0.1% or less C containing Ti and the control of ferritic grain size can optimize the balance between strength, workability, and magnetic characteristics. The detail of the invention is described in the following.

A steel comprising mainly of 0.05 to 0.08% C, 0.01% Si, 0.5 to 0.95% Mn, 0.010% P, 0.003% S, 0.04% Al, 0.0030% N, and 0.01 to 0.16% Ti was prepared by melting process, then hot-rolled at a finishing temperature of 840° C. of, and coiled at 600° C., thus producing hot-rolled steel sheets having 4.5 mm in thickness. The contents of Mn and Ti and the cooling speed after the hot-rolling were varied to change the ferritic grain size. Thus obtained hot-rolled steel sheets were tested to determine the magnetic flux density B500 (T) at 50 kA/m, the magnetic permeability (G/Oe) at 30 kA/m, the tensile strength TS (MPa), and the total elongation El (%).

The result is given in FIG. 1. The values outside of parentheses indicate the magnetic permeability, and the values inside of parentheses indicate the balance between strength and ductility (TS×El).

When the ferritic grain size $\alpha$ satisfies the equation (2) the high magnetic permeability not less than 60 G/Oe and the favorable TS×El can be attained.

Multiple regression analysis was applied to determine the relation between the amount of ingredients including the impurities in the steel which satisfies the above-given ferritic grain size condition and the magnetic flux density B500, and it was revealed that the high magnetic flux density is obtained when the equation (1) is satisfied.

The reasons to limit the content of each chemical composition are described below.

Carbon is an element to form Ti and Nb fine carbides, thus increasing the tensile strength of steel. To obtain the tensile strength of 490 MPa or more, the C content is necessary to be 0.04% or more. On the other hand, if the C content exceeds 0.09%, a large amount of cementites precipitate, significantly degrading the magnetic permeability, the magnetic flux density, and the El. Consequently, the C content is specified to a range of from 0.04 to 0.09%, preferably from 0.05 to 0.08%.

Silicon is an effective element to increase the tensile strength of steel. If, however, the Si content exceeds 0.1%, reddish scale is formed to degrade the surface quality. Therefore, the Si content is specified to 0.1% or less, preferably 0.03% or less.

Manganese is an effective element to increase the tensile strength of steel and the heat-affected zone of welded section through the solid solution strengthening, and thus an essential element according to the present invention. To attain the effect, the Mn content is required to be 0.5% or more. If, however, the Mn content exceeds 1.5%, the El significantly decreases, and the magnetic characteristics also degrade. As a result, the Mn content is specified to a range of from 0.5 to 1.5%, preferably from 0.5 to 1.0%.

Phosphorus segregates to grain boundaries of steel sheet, thus inducing the boundary brittleness. Accordingly, the P content is specified to 0.02% or less.

Large amount of sulfur induces MnS precipitation, and degrades the stretch flangeability. Therefore, the S content is specified to 0.01% or less, preferably 0.005% or less, and more preferably 0.003% or less.

Aluminum is added as a deoxidizer normally to 0.01% or more. If, however, the Al content exceeds 0.1%, the magnetic permeability and the workability degrade. Consequently, the Al content is specified to 0.1% or less, preferably from 0.01 to 0.05%.

Nitrogen is precipitated as a nitride to prevent the formation of coarse grains during welding, thus improving the toughness at welded section. To attain the effect, the N content is necessary to be 0.001% or more. If, however, the N content exceeds 0.008%, a large amount of nitrides precipitate to reduce the El. Therefore, the N content is specified to a range of from 0.001 to 0.008%.

Titanium is precipitated as TiC to strengthen the steel. If, however, the Ti content is less than 0.01%, the effect is not sufficient, and if it exceeds 0.15%, the solid solution Ti increases to degrade the magnetic permeability. Consequently, the Ti content is specified to a range of from 0.01 to 0.15%, preferably from 0.035 to 0.15%.

The high tensile strength hot-rolled steel sheet containing Ti may cause the softening of HAZ. To prevent the softening of HAZ, it is necessary that 0.4% or less Cr and 0.2% or less Mo are added, and that the ferritic grain size a satisfies the equation (4).

In this case, instead of Ti, or along with Ti, Nb may be added to a range of from 0.005 to 0.05%. To attain the high magnetic permeability and the high TS×El, however, the ferritic grain size $\alpha$ is required to satisfy the equation (3) as shown in FIG. 2.

To attain the high magnetic flux density, it is necessary for the amount of ingredients including impurities to satisfy the equation (1), as in the case of high tensile strength hot-rolled steel sheet added with only Ti.

The specification of ferritic grain size by the equations (2) and (3) is explained in view of metallurgy in the following. If the ferritic grain size is less than 3 μm, the fine grain size fails to provide sufficient level of magnetic permeability. On the other hand, if the ferritic grain size exceeds the upper limit, the TS×El significantly decreases. This is because, when TS is unchanged, the ferritic grain size above the upper limit makes the El reduce in an exponential pattern.

The reason that the upper limit of ferritic grain size depends on the Ti amount or the (Ti+Nb) amount is that the ferritic grain size necessary to assure the TS by the amount of Ti or of Nb varies. For example, if the amount of Ti or of (Ti+Nb) is increased, the precipitates of NbC, TiC, or compound of them are finely dispersed even when the ferritic grain becomes coarse to some extent, so that the TS can be assured. If, however, the amount of Ti or of Nb is excessive, the amount of solid solution Ti and of solid solution Nb increases to degrade the magnetic permeability. On the other hand, if the amount of Ti or of (Ti+Nb) is small, the TS cannot be secured, and the amount of pearlites increases to significantly decrease the El, thus degrading the TS×El.

The similar effect is obtained when the pearlite area percentage is specified to 5% or less, preferably 2% or less, instead of the above-described control of ferritic grain size. If the pearlite area percentage exceeds 5%, C is enriched in the pearlite to decrease the precipitates of TiC and NbC, which not only induces the reduction in TS but also increases the amount of solid solution Ti and solid solution Nb to result in the degradation of magnetic permeability. In this case, it is not necessary for the amount of ingredients including impurities to satisfy the equation (1). However, if the ferritic grain size satisfies the equation (2) or the equation (3), higher magnetic permeability and higher TS×El can be obtained. The term "pearlite area percentage" referred to herein means the percentage of pearlite in a view area under an optical microscope or an electron microscope, expressing in area percentage.

A high tensile strength hot-rolled steel sheet according to the present invention can be manufactured by a method which comprises the steps of: preparing a slab of steel containing the above-described chemical compositions; hot-rolling the slab at a finishing temperature of from $Ar_3$ transformation point to 880° C.; cooling the hot-rolled steel sheet to a temperature range of from 630 to 680° C. at an average cooling speed of from 15 to 35° C./sec.

If the finishing temperature is lower than the $Ar_3$ transformation point, the ferrite recrystallizes in a state of TiC precipitation, which results in a mixed grain structure, thus degrading the workability. If the finishing temperature exceeds 880° C., a local recovery of austenite (γ) occurs before the transformation, which results in a non-homogeneous structure. By controlling the finish temperature to 880° C. or below, the transformation occurs before the deformed γ recovers, so that the ferritic grain size after the transformation becomes homogeneous, thus improving the El.

The cooling condition immediately after the finish rolling is extremely important to maximize the characteristics of high tensile strength hot-rolled steel sheet according to the present invention. When the average cooling speed is set to 15° C./sec or more, the amount of cementites decreases, and the TS×El improves. When the average cooling speed is set to 35° C./sec or less, the Ti and Nb precipitate as carbides, leaving no solid solution Ti and Nb, so that the magnetic permeability and the magnetic flux density increase. If the cooling end temperature exceeds 680° C., the grains become coarse and the amount of cementites increases, and the TS and the El decrease. The coiling temperature is not specifically limited. However, the coiling temperature is preferably 500° C. or above to have a good coil shape.

A high tensile strength hot-rolled steel sheet according to the present invention can also be manufactured by a method which comprises the steps of: preparing a slab of steel containing the above-described chemical compositions; hot-rolling the slab at a finishing temperature of from $Ar_3$ transformation point to 880° C.; cooling the hot-rolled steel sheet to 680° C. at an average cooling speed of 15° C./sec or more; and coiling the cooled steel sheet at a coiling temperature of from 500 to 650° C.

In the case that the upper limit of average cooling speed is not specified, as above, high magnetic permeability and TS of 490 MPa or more can be surely attained if only the steel is cooled to 680° C. immediately after the finish rolling at an average cooling speed of 15° C./sec or more, preferably 100° C./sec or more, then the cooled steel sheet is coiled at a temperature of from 500 to 650° C., because no solid solution Ti and Nb remains, no large amount of pearlites is formed, and no coarse carbide of Ti and Nb exists.

The preparation of the steel for high tensile strength hot-rolled steel sheet according to the present invention may be carried out in a converter or in an electric furnace. The cast slab may be subjected to direct rolling immediately or after heated to some extent in order to make up heat. The same effect of the present invention can be obtained also by heating the slab between rough rolling and finish rolling, or by continuously rolling the slab wherein the sheet bars after rough rolling are joined. In this case, if the reduction rate at the final pass of finish rolling is set to less than 30%, the steel sheet after rolling has a good shape, and thus succeeding shape correction is not required, which prevents the degradation of magnetic characteristics.

The high tensile strength hot-rolled steel sheet according to the present invention does not change the characteristics even in a state of scale existence or in a state after descaled. As for the temper rolling, no special limitation is given if only the normal practice is applied. Furthermore, hot dip galvanizing can be applied to the steel sheet with scale or without scale.

EXAMPLE 1

The steels No. 1 through 14 having the chemical compositions shown in Table 1 were prepared by melting process. Using these steels, the hot-rolled steel sheets No. 1 through 14 having 4.5 mm in thickness were manufactured under the conditions of finishing temperatures of from 820 to 840° C., coiling temperatures of from 400 to 600° C., and the average cooling speeds of from 5 to 100° C./sec in a range of from immediately after the finish rolling to the temperatures of from 630 to 680° C. The steel sheets Nos. 1 through 6 are the ones having different Ti content. The steel sheets Nos. 8 through 13 are the ones containing almost equal contents of main compositions and having various ferritic grain sizes. The steel sheets Nos. 7 and 14 are a conventional high tensile strength hot-rolled steel sheet containing large amount of C.

Table 2 shows the results of the tensile characteristics (TS, El), the magnetic permeability, and the magnetic flux density B500 of the steel sheets.

The Example steel sheets Nos. 2 through 4 according to the present invention provide higher El, higher magnetic permeability, and higher magnetic flux density than the Conventional example steel sheets. For the Comparative example steel sheet No. 1, less amount of Ti gives coarse ferritic grains, low TS value, and poor TS×El owing to the pearlite precipitation. For the Comparative example steel sheet No. 5, large amount of Ti gives poor TS×El, low magnetic permeability, and low magnetic flux density. For the Comparative example steel sheet No. 6, large total amount of all compositions gives low magnetic permeability and low magnetic flux density. The Conventional example steel sheet No. 7 gives poor TS×El, low magnetic permeability, and low magnetic flux density.

The Example steel sheets Nos. 9 through 11 having various ferritic grain sizes give higher TS and El, higher magnetic permeability, and higher magnetic flux density than the Conventional example steel sheets. The Comparative example steel sheet No. 8, however, fails to attain sufficient magnetic flux density and magnetic permeability because of the fine ferritic grain size. The Comparative example steel sheet No. 12 gives poor TS×El due to the ferritic grain size exceeding the range of the present invention. For the Comparative example steel sheet No. 13, large total amount of all compositions gives low magnetic permeability and low magnetic flux density. For the Conventional example steel sheet No. 14, the TS×El is poor.

TABLE 1

| No. | C | Si | Mn | P | S | Al | N | Ti | Cu | Sn | Other | Value in eq. (1) |
|---|---|---|---|---|---|---|---|---|---|---|---|---|
| 1 | 0.055 | 0.01 | 0.51 | 0.008 | 0.002 | 0.023 | 0.0030 | 0.03 | 0.01 | 0.002 | Cr: 0.049, O: 0.0030 | 0.59 |
| 2 | 0.055 | 0.01 | 0.52 | 0.008 | 0.002 | 0.025 | 0.0028 | 0.07 | 0.02 | 0.002 | Cr: 0.051, O: 0.0030 | 0.71 |
| 3 | 0.056 | 0.01 | 0.51 | 0.008 | 0.002 | 0.028 | 0.0029 | 0.09 | 0.04 | 0.005 | Cr: 0.056, O: 0.0031 | 0.93 |
| 4 | 0.056 | 0.02 | 0.53 | 0.010 | 0.002 | 0.025 | 0.0030 | 0.11 | 0.02 | 0.003 | Cr: 0.055, O: 0.0030 | 0.85 |
| 5 | 0.057 | 0.01 | 0.52 | 0.009 | 0.002 | 0.030 | 0.0028 | 0.17 | 0.01 | 0.001 | Cr: 0.035, O: 0.0033 | 0.71 |
| 6 | 0.058 | 0.02 | 0.55 | 0.008 | 0.003 | 0.031 | 0.0029 | 0.10 | 0.05 | 0.010 | Cr: 0.08, Mo: 0.12, Nb: 0.01, O: 0.0030 | 2.15 |
| 7 | 0.10 | 0.02 | 1.30 | 0.011 | 0.003 | 0.034 | 0.0035 | 0.06 | 0.03 | 0.003 | Cr: 0.042, O: 0.0030 | 1.01 |
| 8 | 0.066 | 0.01 | 0.65 | 0.011 | 0.002 | 0.036 | 0.0031 | 0.11 | 0.02 | 0.005 | V: 0.004 | 0.77 |
| 9 | 0.068 | 0.01 | 0.66 | 0.011 | 0.003 | 0.036 | 0.0035 | 0.11 | 0.02 | 0.005 | V: 0.004 | 0.80 |
| 10 | 0.068 | 0.01 | 0.67 | 0.010 | 0.002 | 0.034 | 0.0031 | 0.11 | 0.02 | 0.005 | V: 0.004 | 0.77 |
| 11 | 0.064 | 0.02 | 0.66 | 0.011 | 0.003 | 0.032 | 0.0032 | 0.11 | 0.02 | 0.005 | V: 0.004 | 0.85 |
| 12 | 0.066 | 0.01 | 0.65 | 0.011 | 0.002 | 0.031 | 0.0033 | 0.11 | 0.02 | 0.005 | V: 0.004 | 0.77 |
| 13 | 0.065 | 0.02 | 0.67 | 0.010 | 0.003 | 0.036 | 0.0035 | 0.11 | 0.08 | 0.050 | V: 0.02 | 2.32 |
| 14 | 0.10 | 0.02 | 1.30 | 0.011 | 0.003 | 0.034 | 0.0035 | 0.09 | 0.02 | 0.005 | V: 0.004 | 0.94 |

TABLE 2

| No. | Value in eq. (1) | Ferritic grain size µm | TS MPa | El % | TS × El | Magnetic permeability µ G/Oe | Magnetic flux density B500 T | Remark |
|---|---|---|---|---|---|---|---|---|
| 1 | 0.59 | 15 | 468 | 29.8 | 13946 | 66.7 | 2.12 | Comparative example |
| 2 | 0.71 | 12 | 588 | 26.9 | 15817 | 66.7 | 2.12 | Example |
| 3 | 0.93 | 11 | 608 | 26.3 | 15990 | 66.5 | 2.12 | Example |
| 4 | 0.85 | 11 | 630 | 25.1 | 15813 | 66.4 | 2.11 | Example |
| 5 | 0.71 | 10 | 653 | 20.1 | 13125 | 60.1 | 2.06 | Comparative example |
| 6 | 2.15 | 10 | 635 | 24.9 | 15812 | 58.3 | 2.01 | Comparative example |
| 7 | 1.01 | — | 631 | 20.8 | 13125 | 53.5 | 2.05 | Conventional example |
| 8 | 0.77 | 2 | 789 | 21.6 | 17042 | 61.5 | 2.06 | Comparative example |
| 9 | 0.80 | 5 | 740 | 23.2 | 17168 | 65.1 | 2.10 | Example |
| 10 | 0.77 | 10 | 732 | 23.5 | 17202 | 65.0 | 2.10 | Example |
| 11 | 0.85 | 12 | 728 | 23.6 | 17181 | 65.2 | 2.10 | Example |
| 12 | 0.77 | 18 | 710 | 20.3 | 14413 | 65.0 | 2.10 | Comparative example |
| 13 | 2.32 | 11 | 730 | 23.5 | 17155 | 55.4 | 1.89 | Comparative example |
| 14 | 0.94 | — | 705 | 20.8 | 14664 | 53.0 | 2.01 | Conventional example |

EXAMPLE 2

The hot-rolled steel sheets No. 21 through 30 having the chemical compositions shown in Table 3 and 4.5 mm in thickness were manufactured under the conditions of a finishing temperature of 850° C., a coiling temperature of 560° C., and the various average cooling speeds in a range of from immediately after the finish rolling to the temperatures of from 630 to 680° C.

Similar with the Example 1, each of thus manufactured steel sheets was tested to determine the tensile characteristics, the magnetic permeability, and the magnetic flux density B500.

Table 3 shows the results. The steel sheets Nos. 21 through 25, and Nos. 26 through 30 were the ones sheets having the same chemical compositions and cooled at different average cooling speeds.

For the Example steel sheets Nos. 22 through 24 and Nos. 27 through 29 of the present invention, high El, high magnetic permeability, and high magnetic flux density are attained because the average cooling speed was in a range of from 15 to 35° C./sec, which is within the range of the present invention.

Similar with the Example 1, each of thus manufactured steel sheets was tested to determine the tensile characteristics, the magnetic permeability, and the magnetic flux density B300. Furthermore, after reduced the sheet thickness to 3.2 mm, each of the steel sheets was tested to determine the hardness reduction ΔHv (0.2 kg of load) at HAZ after the TIG bead-on welding (heat input of 6 kJ/cm).

Table 5 shows the results.

TABLE 3

| No. | C | Si | Mn | P | S | Al | N | Ti | Other | Average cooling speed °C./s | TS MPa | El % | Magnetic permeability μ G/Oe | Magnetic flux density B500 T | Remark |
|---|---|---|---|---|---|---|---|---|---|---|---|---|---|---|---|
| 21 | 0.067 | 0.01 | 0.67 | 0.012 | 0.003 | 0.038 | 0.0035 | 0.11 | Cu: 0.03, V: 0.009 | <u>5</u> | 628 | 27.2 | 63.5 | 2.08 | C |
| 22 | 0.067 | 0.01 | 0.67 | 0.012 | 0.002 | 0.038 | 0.0034 | 0.11 | Cu: 0.02, V: 0.009 | 17 | 730 | 22.8 | 65.0 | 2.09 | E |
| 23 | 0.067 | 0.01 | 0.68 | 0.011 | 0.002 | 0.039 | 0.0033 | 0.11 | Cu: 0.03, V: 0.005 | 23 | 732 | 23.4 | 65.0 | 2.10 | E |
| 24 | 0.067 | 0.02 | 0.67 | 0.012 | 0.002 | 0.037 | 0.0036 | 0.11 | Cu: 0.02, V: 0.009 | 28 | 728 | 23.5 | 65.1 | 2.10 | E |
| 25 | 0.067 | 0.02 | 0.67 | 0.011 | 0.002 | 0.038 | 0.0034 | 0.11 | Cu: 0.03, V: 0.009 | <u>40</u> | 798 | 19.8 | 62.3 | 2.08 | C |
| 26 | 0.055 | 0.01 | 0.87 | 0.006 | 0.002 | 0.023 | 0.0046 | 0.06 | Sn: 0.003 | <u>8</u> | 498 | 23.3 | 62.0 | 2.11 | C |
| 27 | 0.054 | 0.01 | 0.88 | 0.007 | 0.003 | 0.022 | 0.0047 | 0.06 | Mo: 0.01 | 19 | 544 | 34.5 | 66.8 | 2.13 | E |
| 28 | 0.055 | 0.01 | 0.86 | 0.006 | 0.002 | 0.023 | 0.0045 | 0.06 | Nb: 0.001, B: 0.0002 | 28 | 543 | 34.7 | 66.8 | 2.13 | E |
| 29 | 0.054 | 0.02 | 0.87 | 0.007 | 0.003 | 0.021 | 0.0044 | 0.06 | O: 0.0035, V: 0.002 | 33 | 540 | 34.3 | 66.7 | 2.13 | E |
| 30 | 0.053 | 0.01 | 087 | 0.007 | 0.002 | 0.023 | 0.0046 | 0.06 | Ca: 0.002 | <u>43</u> | 602 | 25.6 | 61.3 | 2.11 | C |

E: Example
C: Comparative example

EXAMPLE 3

The steels No. 31 through 42 having the chemical compositions shown in Table 4 were prepared by melting process. The steels Nos. 31 through 37 are the Example steels. The steels Nos. 38 through 42 are the Comparative example steels. The steel No. 38 has the C content out of the range of the present invention. The steels Nos. 39 and 40 do not satisfy the equation (3). The steel No. 41 has the Mn content out of the range of the present invention. The steel No. 42 has the Ti content out of the range of the present invention. Using these steels, the hot-rolled steel sheets No. 31 through 42 having 4.5 mm in thickness were manufactured under the conditions of finishing temperatures of from 820 to 840° C., coiling temperatures of from 530 to 630° C., and the average cooling speeds of from 15 to 40° C./sec in a range of from immediately after the finish rolling to the temperatures of 680° C. or lower.

For the Example steel sheets Nos. 31 through 37, both the TS×El and the magnetic flux density are high, and the value of ΔHv is as low as 40 or less. In particular, for the steel sheet No. 33, the magnetic flux density and the magnetic permeability are extremely high.

On the other hand, for the Comparative example steel sheets Nos. 38 through 42, all the characteristics which should be required could not be attained at a time. For the steel sheet No. 38, the TS×El is significantly poor, and the magnetic flux density and the magnetic permeability are low. For the steel sheets Nos. 39 and 40, both the magnetic flux density and the magnetic permeability are significantly reduced. For the steel sheet No. 41, the value of ΔHv is extremely large. For the steel sheet No. 42, the magnetic permeability is low.

TABLE 4

| No. | C | Si | Mn | P | S | Al | N | Nb | Ti | Mo | Cr | Left side of eq. (1) | α μm | Left side of eq. (3) | Remark |
|---|---|---|---|---|---|---|---|---|---|---|---|---|---|---|---|
| 31 | 0.044 | 0.01 | 0.80 | 0.011 | 0.003 | 0.031 | 0.0031 | — | 0.04 | — | 0.15 | 0.75 | 10 | 1.20 | E |
| 32 | 0.069 | 0.01 | 1.47 | 0.009 | 0.002 | 0.023 | 0.0028 | — | 0.08 | — | — | 0.52 | 9.4 | 1.00 | E |
| 33 | 0.068 | 0.01 | 0.87 | 0.008 | 0.003 | 0.022 | 0.0029 | — | 0.08 | — | 0.02 | 0.59 | 10 | 0.49 | E |
| 34 | 0.072 | 0.01 | 0.58 | 0.008 | 0.003 | 0.024 | 0.0036 | — | 0.08 | 0.11 | 0.01 | 1.34 | 12 | 1.71 | E |
| 35 | 0.074 | 0.01 | 1.14 | 0.014 | 0.003 | 0.030 | 0.0035 | 0.03 | 0.02 | — | — | 0.76 | 5.5 | 0.86 | E |
| 36 | 0.058 | 0.01 | 1.20 | 0.009 | 0.003 | 0.030 | 0.0028 | — | 0.06 | — | 0.10 | 0.65 | 6.3 | 1.49 | E |
| 37 | 0.080 | 0.02 | 1.32 | 0.013 | 0.002 | 0.026 | 0.0027 | 0.04 | — | — | — | 0.81 | 4.6 | 1.09 | E |
| 38 | <u>0.110</u> | 0.01 | 0.91 | 0.009 | 0.003 | 0.029 | 0.0032 | — | 0.11 | — | — | 0.62 | 7.7 | 0.53 | C |
| 39 | 0.071 | 0.01 | 0.88 | 0.010 | 0.002 | 0.029 | 0.0025 | — | 0.12 | — | 0.26 | 0.94 | 7.6 | <u>2.06</u> | C |
| 40 | 0.069 | 0.01 | 0.79 | 0.011 | 0.003 | 0.023 | 0.0035 | — | 0.08 | 0.12 | 0.02 | 1.35 | 8.0 | <u>2.31</u> | C |
| 41 | 0.079 | 0.01 | <u>0.40</u> | 0.010 | 0.003 | 0.028 | 0.0031 | — | 0.11 | — | — | 0.48 | 13 | <u>−0.25</u> | C |
| 42 | 0.049 | 0.02 | 1.31 | 0.008 | 0.002 | 0.034 | 0.0032 | — | <u>0.16</u> | — | — | 0.66 | 7.6 | 0.93 | C |

E: Example
C: Comparative example

TABLE 5

| No. | TS MPa | El % | TS × El | B300 T | μ G/Oe | ΔHv | Remark |
|---|---|---|---|---|---|---|---|
| 31 | 599 | 28.3 | 17000 | 2.02 | 63 | 18 | Example |
| 32 | 831 | 19.6 | 16300 | 2.02 | 63 | 20 | Example |
| 33 | 705 | 24.0 | 16900 | 2.05 | 66 | 32 | Example |
| 34 | 743 | 22.1 | 16400 | 2.00 | 63 | 18 | Example |
| 35 | 658 | 25.4 | 16700 | 2.02 | 62 | 26 | Example |
| 36 | 694 | 24.3 | 16900 | 2.01 | 62 | 24 | Example |
| 37 | 615 | 28.0 | 17200 | 2.02 | 64 | 22 | Example |
| 38 | 685 | 18.7 | 12800 | 1.98 | 60 | 24 | Comparative example |
| 39 | 820 | 19.5 | 16000 | 1.94 | 57 | 14 | Comparative example |
| 40 | 832 | 20.8 | 17300 | 1.92 | 57 | 0 | Comparative example |
| 41 | 682 | 24.6 | 16800 | 2.04 | 64 | 84 | Comparative example |
| 42 | 736 | 22.6 | 16600 | 2.00 | 59 | 38 | Comparative example | example steel sheet No. 7 gives low magnetic permeability and low magnetic flux density.

TABLE 6

(mass %)

| Steel No. | C | Si | Mn | P | S | Al | N | Ti | Remark |
|---|---|---|---|---|---|---|---|---|---|
| 1 | 0.068 | 0.01 | 0.86 | 0.01 | 0.003 | 0.044 | 0.003 | 0.05 | Example |
| 2 | 0.079 | 0.02 | 0.62 | 0.01 | 0.003 | 0.036 | 0.003 | 0.12 | Example |
| 3 | 0.086 | 0.24 | 1.31 | 0.01 | 0.002 | 0.041 | 0.003 | 0.08 | Comparative example |

TABLE 7

| No. | Steel No. | Finishing temperature (° C.) | Cooling speed (° C./s) | Coiling temperature (° C.) | Pearlite percentage (%) | TS (MPa) | El (%) | TS × El | B300 (T) | μ (G/Oe) | Shape correction | Remark |
|---|---|---|---|---|---|---|---|---|---|---|---|---|
| 1 | 1 | 840 | 35 | 600 | 1.6 | 560 | 28.3 | 15848 | 2.05 | 66 | Not necessary | Example |
| 2 | 1 | 860 | 30 | 580 | 1.1 | 571 | 27.8 | 15874 | 2.05 | 66 | Not necessary | Example |
| 3 | 1 | 850 | _5_ | 600 | _5.4_ | 476 | 28.2 | 13423 | 2.05 | 65 | Not necessary | Comparative example |
| 4 | 1 | _810_ | 35 | 600 | 2.3 | 533 | 27.9 | 14871 | 2.01 | 63 | Not necessary | Comparative example |
| 5 | 2 | 860 | 50 | 620 | 1.4 | 702 | 22.8 | 16006 | 2.05 | 64 | Not necessary | Example |
| 6 | 2 | 855 | 30 | 430 | 0.7 | 780 | 16.3 | 12714 | 2.02 | 59 | Necessary | Comparative example |
| 7 | _3_ | 840 | 30 | 580 | _6.2_ | 584 | 25.0 | 14600 | 1.99 | 58 | Not necessary | Comparative example |

EXAMPLE 4

The steels No. 1 through 3 having the chemical compositions shown in Table 6 were prepared by melting process. Using these steels, the hot-rolled steel sheets No. 1 through 7 having 4.5 mm in thickness were manufactured under the conditions of finishing temperatures of from 810 to 860° C., coiling temperatures of from 400 to 600° C., the reduction rate at a final pass of finish rolling of 12%, and the average cooling speeds of from 5 to 50° C./sec in a range of from immediately after the finish rolling to the temperatures of from 630 to 680° C.

Similar with the Example 1, each of thus manufactured steel sheets was tested to determine the tensile characteristics, the magnetic permeability, and the magnetic flux density B300.

Table 7 shows the results.

For the Example steel sheets Nos. 1, 2 and 5, the TS×El, the magnetic permeability, and the magnetic flux density are high.

On the other hand, for the Comparative example steel sheets Nos. 3 and 4, the TS is low. The Comparative example steel sheet No. 6 gives low El and low magnetic permeability, and poor shape of the sheet. The Comparative

What is claimed is:

1. A high tensile strength hot-rolled steel sheet comprising 0.04 to 0.09% C, 0.1% or less Si, 0.5 to 1.5% Mn, 0.02% or less P, 0.01% or less S, 0.1% or less Al, 0.001 to 0.008% N, 0.01 to 0.15% Ti, by mass %, and the balance being iron and inevitable impurities, whereby the content of alloying elements X satisfies the following equation (1), and the ferritic grain size α (μm) satisfies the following equation (2):

$$[C]+7\times[Si]+0.1\times[Mn]+[P]+14\times[S]+1.75\times[Al]$$
$$+23\times[N]+[Ti]+18\times[O]+7\times[Cu]+18\times[Sn]+7\times[Mo]+$$
$$1.7\times[Cr]+70\times[B]+7\times[Ca]+14\times[Zr]+14\times[V]+7\times[Nb]$$
$$\leq 2 \quad (1)$$

$$3\leq\alpha\leq60\times[Ti]+8 \quad (2)$$

where [X] denotes the content in mass % of each alloying element X.

2. A high tensile strength hot-rolled steel sheet comprising 0.04 to 0.09% C, 0.1% or less Si, 0.5 to 1.5% Mn, 0.02% or less P, 0.01% or less S, 0.1% or less Al, 0.001 to 0.008% N, 0.2% or less Mo, 0.4% or less Cr, at least one element selected from the group consisting of 0.01 to 0.15% Ti and 0.005 to 0.05% Nb, by mass %, and the balance being iron and inevitable impurities, whereby the content of alloying elements satisfies the equation (1) in claim 1, and the ferritic grain size α (μm) satisfies the following equations (3) and (4):

$$3 \leq \alpha \leq 60 \times ([Ti]+[Nb])+8 \quad (3)$$

$$[Mn]+6\times[Cr]+15\times[Mo]-0.05\times\alpha \leq 2 \quad (4)$$

where, [X] denotes the content in mass % of each alloying element X.

3. A method for manufacturing a high tensile strength hot-rolled steel sheet comprising the steps of:
preparing a slab of steel comprising the chemical compositions described in claim 1;
hot-rolling the slab at a finishing temperature of from $Ar_3$ transformation point to 880° C.;
cooling the hot-rolled steel sheet to a temperature range of from 630 to 680° C. at an average cooling speed of from 15 to 35° C./sec.

4. A method for manufacturing a high tensile strength hot-rolled steel sheet comprising the steps of:
preparing a slab of steel comprising the chemical compositions described in claim 1;
hot-rolling the slab at a finishing temperature of from $Ar_3$ transformation point to 880° C.;
cooling the hot-rolled steel sheet to 680° C. at an average cooling speed of 15° C./sec or more;
and coiling the cooled steel sheet at a coiling temperature of from 500 to 650° C.

5. A generator rotor comprising the high tensile strength hot-rolled steel sheet described in claim 1.

6. A generator rotor comprising the high tensile strength hot-rolled steel sheet described in claim 2.

7. A method for manufacturing a high tensile strength hot-rolled steel sheet comprising the steps of:
preparing a slab of steel comprising the chemical compositions described in claim 2;
hot-rolling the slab at a finishing temperature of from $Ar_3$ transformation point to 880° C.;
cooling the hot-rolled steel sheet to a temperature range of from 630 to 680° C. at an average cooling speed of from 15 to 35° C./sec.

8. A method for manufacturing a high tensile strength hot-rolled steel sheet comprising the steps of:
preparing a slab of steel comprising the chemical compositions described in claim 2;
hot-rolling the slab at a finishing temperature of from $Ar_3$ transformation point to 880° C.;
cooling the hot-rolled steel sheet to 680° C. at an average cooling speed of 15° C./sec or more;
and coiling the cooled steel sheet at a coiling temperature of from 500 to 650° C.

9. The high tensile strength hot-rolled steel sheet according to claim 1, wherein the C is in an amount of 0.05 to 0.08 mass %; the Si is in an amount of 0.03 mass % or less; the Mn is in an amount of 0.5 to 1.0 mass %; the S is in an amount of 0.005 mass % or less; the Al is in an amount of 0.01 to 0.05 mass %; and the Ti is in an amount of 0.035 to 0.15 mass %.

10. The high tensile strength hot-rolled steel sheet according to claim 9, wherein the S is in an amount of 0.003 mass % or less.

11. The high tensile strength hot-rolled steel sheet according to claim 2, wherein the C is in an amount of 0.05 to 0.08 mass %; the Si is in an amount of 0.03 mass % or less; the Mn is in an amount of 0.5 to 1.0 mass %; the S is in an amount of 0.005 mass % or less; the Al is in an amount of 0.01 to 0.05 mass %; and the Ti is in an amount of 0.035 to 0.15 mass %.

12. The high tensile strength hot-rolled steel sheet according to claim 11, wherein the S is in an amount of 0.003 mass % or less.

* * * * *